(12) United States Patent
Mercer

(10) Patent No.: US 7,466,135 B2
(45) Date of Patent: *Dec. 16, 2008

(54) BORING TECHNIQUE USING LOCATE POINT MEASUREMENTS FOR BORING TOOL DEPTH PREDICTION

(75) Inventor: John E. Mercer, Kent, WA (US)

(73) Assignee: Merlin Technology, Inc., Kent, WA (US)

( * ) Notice: Subject to any disclaimer, the term of this patent is extended or adjusted under 35 U.S.C. 154(b) by 169 days.

This patent is subject to a terminal disclaimer.

(21) Appl. No.: 11/385,503

(22) Filed: Mar. 20, 2006

(65) Prior Publication Data

US 2006/0158194 A1 Jul. 20, 2006

Related U.S. Application Data

(63) Continuation of application No. 11/215,540, filed on Aug. 30, 2005, now Pat. No. 7,049,820, which is a continuation of application No. 10/854,855, filed on May 27, 2004, now Pat. No. 6,954,073, which is a continuation of application No. 10/389,423, filed on Mar. 13, 2003, now Pat. No. 6,838,882, which is a continuation of application No. 10/116,505, filed on Apr. 4, 2002, now Pat. No. 6,559,646, which is a continuation of application No. 09/659,908, filed on Sep. 12, 2000, now Pat. No. 6,396,275, which is a continuation of application No. 09/448,647, filed on Nov. 24, 1999, now Pat. No. 6,160,401, which is a continuation of application No. 09/047,874, filed on Mar. 25, 1998, now Pat. No. 6,014,026, which is a continuation-in-part of application No. 08/990,498, filed on Dec. 15, 1997, now Pat. No. 5,933,008, which is a continuation-in-part of application No. 08/712,325, filed on Sep. 11, 1996, now Pat. No. 5,764,062, which is a continuation-in-part of application No. 08/615,467, filed on Mar. 14, 1996, now Pat. No. 5,698,981.

(51) Int. Cl.
G01V 3/11 (2006.01)

(52) U.S. Cl. .................................... 324/329

(58) Field of Classification Search .................. 324/67, 324/207.11–207.17, 207.22, 207.26, 326–329, 324/345, 346, 202, 225, 66; 175/45
See application file for complete search history.

(56) References Cited

U.S. PATENT DOCUMENTS 5,155,442 A 10/1992 Mercer (Continued)

OTHER PUBLICATIONS

Cogent Technology, The Mole Monitor System, Mar. 1992, Cogent Technology Product Brochure.

(Continued)

*Primary Examiner*—Jay M Patidar
(74) *Attorney, Agent, or Firm*—Pritzkau Patent Group, LLC

(57) ABSTRACT

A method is disclosed as part of an overall process in which a boring tool is moved through the ground within a given region along a particular path in an orientation which includes pitch. A locating signal is transmitted from the boring tool which signal exhibits a field defined forward point within a reference surface which field defined forward point is vertically above an inground forward point on the particular path through which the boring tool is likely to pass. The method establishes a predicted depth of the boring tool at the inground forward point by first identifying the field defined forward point. The signal strength of the locating signal is then measured at the field defined forward point as being representative of the depth of the boring tool at an inground upstream point which is the current location of the boring tool. With the boring tool at the upstream inground point, the pitch of the boring tool is determined. Using the measured signal strength and the determined pitch, the predicted depth of the boring tool is determined for the inground forward point based on the boring tool moving along an approximately straight path to the inground forward point.

13 Claims, 7 Drawing Sheets

U.S. PATENT DOCUMENTS

| | | |
|---|---|---|
| 5,337,002 A | 8/1994 | Mercer |
| 5,444,382 A | 8/1995 | Mercer |
| 5,469,155 A | 11/1995 | Archambeault et al. |
| 5,633,589 A | 5/1997 | Mercer |
| 5,698,981 A | 12/1997 | Mercer |
| 5,711,381 A | 1/1998 | Archambeault et al. |
| 5,764,062 A | 6/1998 | Mercer |
| 5,767,678 A | 6/1998 | Mercer |
| 5,933,008 A | 8/1999 | Mercer |
| 6,102,136 A | 8/2000 | Archambeault et al. |
| 6,427,784 B1 | 8/2002 | Archambeault et al. |

OTHER PUBLICATIONS

Cogent Technology, Directional Drill Monitoring, Dec. 1991, Equipment Update, No-Dig International Conference.

Radiodetection Limited, Monitoring the Progress of Horizontal Boring Tools, Apr. 1990, Radiodetection Limited Tradeshow Handout.

SIDE VIEW

FRONT VIEW

BORING TECHNIQUE USING LOCATE POINT MEASUREMENTS FOR BORING TOOL DEPTH PREDICTION

RELATED APPLICATIONS

The present application is a continuation application of prior application Ser. No. 11/215,540 filed Aug. 30, 2005, now U.S. Pat. No. 7,049,820 which is a continuation application of application Ser. No. 10/854,855 filed May 27, 2004 and issued on Oct. 11, 2005 as patent U.S. Pat. No. 6,954,073; which is a continuation of application Ser. No. 10/389,423 filed Mar. 13, 2003 and issued on Jan. 4, 2005 as patent U.S. Pat. No. 6,838,882; which is a continuation of application Ser. No. 10/116,505 filed Apr. 4, 2002 and issued on May 6, 2003 as patent U.S. Pat. No. 6,559,646; which is a continuation of application Ser. No. 09/659,908 filed on Sep. 12, 2000 and issued on May 28, 2002 as patent U.S. Pat. No. 6,396,275; which is a continuation of application Ser. No. 09/448,647 filed on Nov. 24, 1999 and issued on Dec. 12, 2000 as patent U.S. Pat. No. 6,160,401; which is a continuation of application Ser. No. 09/047,874 filed on Mar. 25, 1998 and issued on Jan. 11, 2000 as patent U.S. Pat. No. 6,014,026; which is a continuation-in-part of application Ser. No. 08/990,498 filed on Dec. 15, 1997 and issued on Aug. 3, 1999 as patent U.S. Pat. No. 5,933,008; which is a continuation-in-part of application Ser. No. 08/712,325 filed on Sep. 11, 1996 and issued on Jun. 9, 1998 as patent U.S. Pat. No. 5,764,062; which is a continuation-in-part of application Ser. No. 08/615,467 filed on Mar. 14, 1996 and issued on Dec. 16, 1997 as patent U.S. Pat. No. 5,698,981, the disclosures of which are incorporated herein by reference.

BACKGROUND OF THE INVENTION

The present invention relates generally to an underground boring technique, especially one which is intended to install underground utility cables, and more particularly to a specific technique for using locate point measurements in predicting the depth of a boring tool at a forward point along a particular path of movement of the boring tool.

Installing underground utility cable using a steerable boring tool is well known in the art. Various examples are described in continuing Mercer U.S. Pat. Nos. 5,155,442, 5,337,002 and 5,444,382 and pending U.S. application Ser. No. 442,481, filed May 16, 1995 which is a continuation of Mercer Patent U.S. Pat. No. 5,444,382 (collectively referred to herein as the Mercer Patents), all of which are incorporated herein by reference. An example of the prior art Mercer technique is best illustrated in FIG. 1 herein which corresponds to FIG. 2 in the Mercer Patents. For purposes of clarity, the reference numerals used in the Mercer Patents have been retained herein for like components.

As seen in FIG. 1, an overall boring machine 24 is positioned within a starting pit 22 and includes a length of drill pipe 10, the front end of which is connected to the back end of a steerable boring head or tool 28. As described in the Mercer Patents, the boring tool includes a transmitter or sonde for emitting a dipole magnetic field 12 which radiates in front of, behind and around the boring tool, as illustrated in part in FIG. 2. A first operator 20 positioned at the starting pit 22 is responsible for operating the boring machine 24, that is, he or she causes the machine to let out the drill pipe, causing it to push the boring tool forward. At the same time, operator 20 is responsible for steering the boring tool through the ground. A second locator/monitor operator 26 is responsible for locating boring tool 28 using a locator or receiver 36. The boring tool is shown in FIG. 1 being guided around an obstacle 30 at a generally constant depth beneath a reference surface 32 until it reaches a termination pit 34. The locator/monitor operator 26 holds locator 36 and uses it to locate the surface position directly above tool head 28. Once operator 26 finds this position, the locator 36 is used to determine the depth tool head 28. Using the particular locator of the present invention, operator 26 can also determine the orientation (yaw, pitch and roll) of tool head 28 and other information pertinent to the present invention, as will be described hereinafter. This information is passed on to operator 20 who uses it to steer the boring tool to its target.

As stated above, the overall arrangement illustrated in FIG. 1 may be used to install underground utility cable. After the boring tool reaches termination pit 34, the cable is connected to the drill pipe and pulled into position within the ground as the drill pipe is pulled back through the underground tunnel to starting pit 22. Once the utility cable is so installed, it would be quite desirable to have a record of where it is actually located within the ground, even if the terrain of the ground changes with time. As will be seen hereinafter, the present invention fulfills this desire in an uncomplicated and reliable way using much of the technology described in the Mercer Patents.

SUMMARY OF THE INVENTION

As will be described in more detail hereinafter, a method is disclosed as part of an overall process in which a boring tool, for example boring tool 28 is moved through the ground within a given region along a particular path in an orientation which includes pitch. A locating signal is transmitted from the boring tool which signal exhibits a field defined forward point within a reference surface which field defined forward point is vertically above an inground forward point on the particular path through which the boring tool is likely to pass. The method establishes a predicted depth of the boring tool at the inground forward point by first identifying the field defined forward point. The signal strength of the locating signal is then measured at the field defined forward point as being representative of the depth of the boring tool at an inground upstream point which is the current location of the boring tool. With the boring tool at the upstream inground point, the pitch of the boring tool is determined. Using the measured signal strength and the determined pitch, the predicted depth of the boring tool is determined for the inground forward point based on the boring tool moving along an approximately straight path to the inground forward point.

DESCRIPTION OF THE DRAWINGS

The particular embodiment of the present invention described briefly above and the present invention generally will be described in more detail hereinafter in conjunction with the drawings wherein.

DETAILED DESCRIPTION OF THE INVENTION

Figures 2, 3:
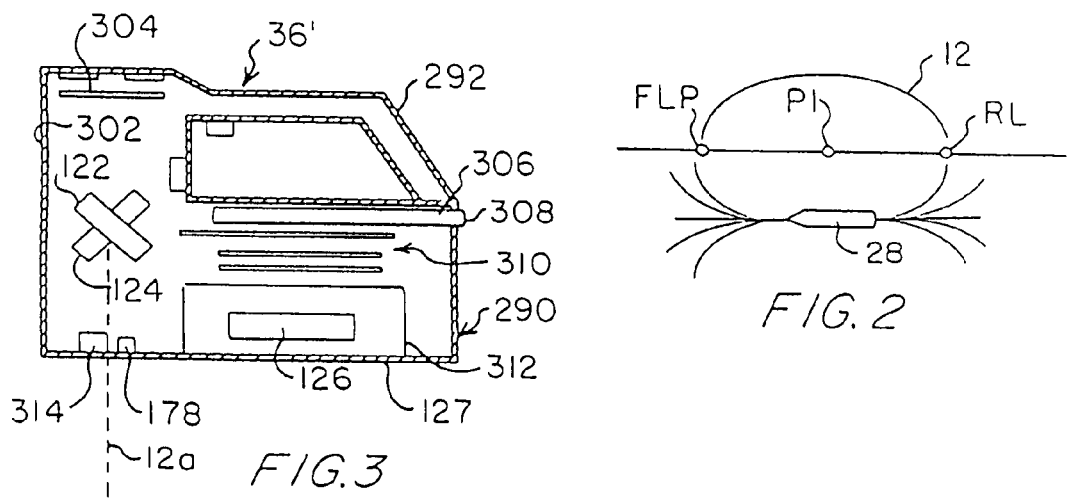
FIG. 2 is a diagrammatic illustration of a boring tool used in the operation shown in FIG. 1 and particularly depicts, in part, the electromagnetic radiation pattern emitted from the transmitter contained by the boring tool.
FIG. 3 is a side elevational view of a locator or receiver which may be used in the operation illustrated in FIG. 1 but which has been modified in accordance with the present invention.

Turning again to the drawings, attention is immediately directed to FIG. 3 which illustrates a locator 36'. With exceptions to be noted, locator 36' may be identical to locator 36 described in the Mercer Patents. Therefore, the same reference numerals used to describe locator 36 in the Mercer Patents have been used to designate corresponding components in locator 36'. In order to understand and appreciate the present invention, the only particular components of locator 36' that form part of locator 36 and that are important to note here are the antenna receiver arrangement comprised of orthogonal antennae 122 and 124 and associated processing circuitry for measuring and suitably processing the field intensity at each antenna and roll/pitch antenna 126 and associated processing circuitry for measuring the pitch and roll of the boring tool. Note specifically that when the base 127 is horizontal and in the plane of the paper, the orthogonal antennae 122 and 124 extend 45° from both the horizontal and vertical. With this in mind, there will be provided immediately below a brief description of the way in which locator 36' is used to locate boring tool 28.

Returning to FIG. 2, as previously mentioned, the boring tool 28 includes a transmitter which emits magnetic field pattern 12. For purposes of the present discussion, let it be assumed that the boring tool is located within the ground immediately below point P1 and is oriented horizontally in the plane of the paper so as to display zero pitch and zero yaw and thereby simplify the present example. Under these circumstances, the flux field from the pattern comes up through the ground with a vertical component within the plane of the boring tool at what may be referred to as a front locate point and a similar vertical flux component extends upward through the ground immediately behind and in the same plane as the boring tool through at what may be referred to as a rear locate point. These front and rear locate points are referred to as lateral locates in the Mercer Patents and, herein, as a group they may be referred to as negative locate points. They can be found by locator 36' in the manner described in the Mercer Patent and reference is made thereto. Briefly, however, operator 26 knows when the locator is directly above either the front locate point FLP or the rear locate point RLP because these are the only isolated two points in which the flux field from the magnetic field pattern bisects the antennae arrangement 122, 124 in the manner shown by a dotted line at 12a in FIG. 3. The operator can tell when this occurs because the field intensity detected by the two antennae will be equal at these two points and the change in relative antenna intensity with movement of the locator will be different than for the points immediately above the boring tool. Finding these locate points is important to the present method, as will be seen hereinafter. The fact that the two locate points lie in a plane through the axis of the boring tool is also important to the present method, as will also been seen.

Figure 4:
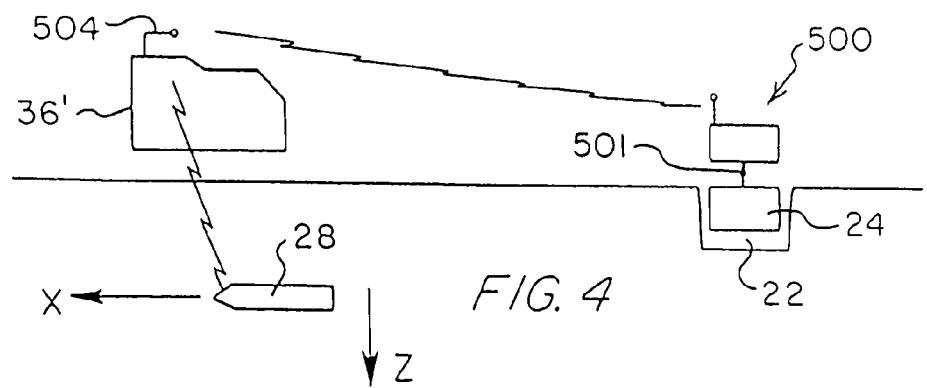
FIG. 4 diagrammatically illustrates the way in which the boring tool of FIG. 1 communicates with the locator of FIG. 3 and the way in which the locator communicates with a cooperating receiver forming part of a remote processing system at the starting pit, that is, at the starting point for the boring tool.

Referring to FIG. 4, the boring tool 28 is shown in the same horizontal position as FIG. 2 and immediately above the boring tool is locator 36'. A remote processing system generally designated by the reference numeral 500 is shown positioned at starting pit 22. The purpose of this FIG. 4 is to illustrate one main difference between locator 36' and locator 36. The latter is able to receive pitch and roll information from boring tool 28 by means of radio wave but there is no such communication between locator 36 and any receiving equipment at starting pit 22. In contrast thereto, locator 36' upon receiving the same information from the boring tool includes readily providable means to be described in conjunction with FIG. 6 including a transmitting antenna 504 (see FIGS. 4 and 6) for relaying roll and pitch information to cooperating receiver hardware 500 as well as other positional information of the boring tool processed by locator 36'. All of this information, that is, the roll and pitch and other positional information is processed by system 500 in accordance with the present invention, as will be described hereinafter.

Figure 5:
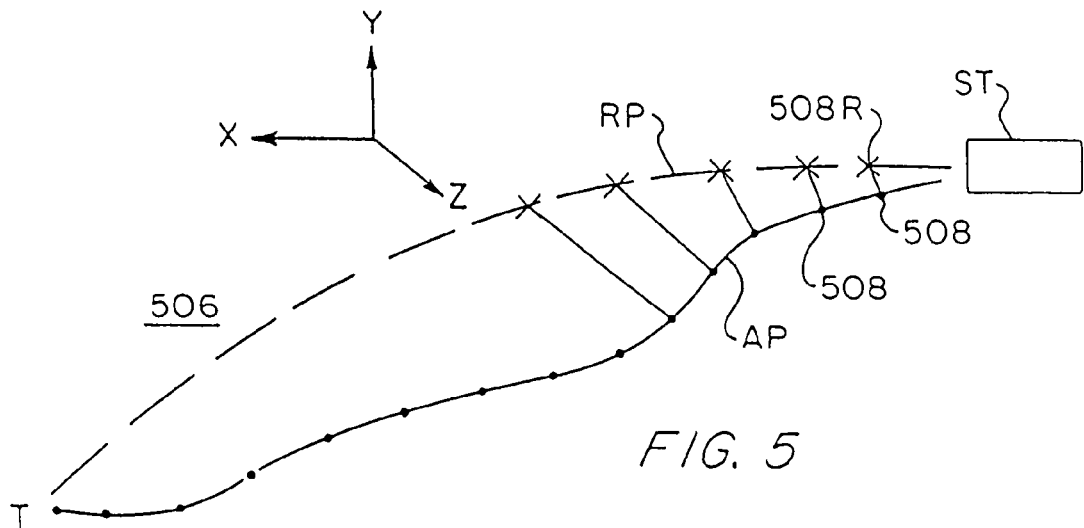
FIG. 5 diagrammatically illustrates the way in which the boring tool actually moves through the ground from its starting point to its terminating or target point along with a particular reference path between those two points.
Figure 7:
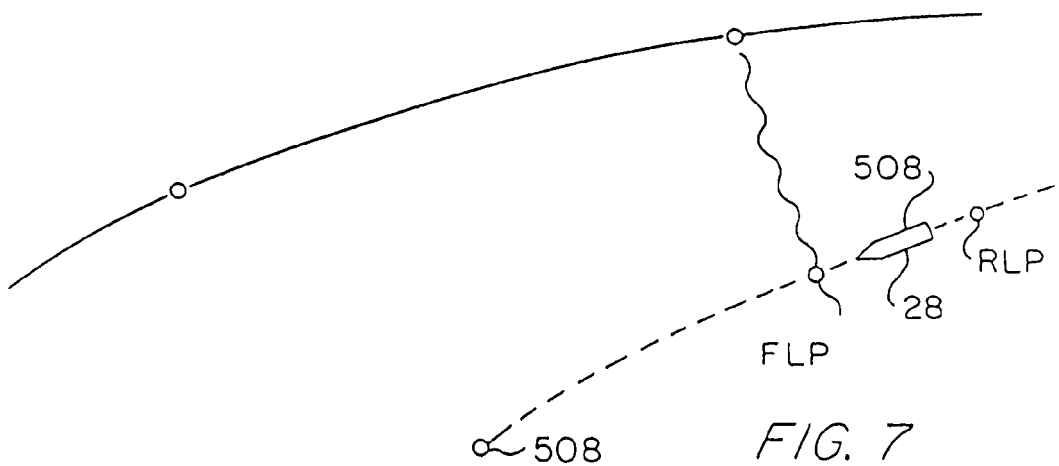
FIG. 7 diagrammatically illustrates a particular procedure used in the last mentioned method.
Figure 6:
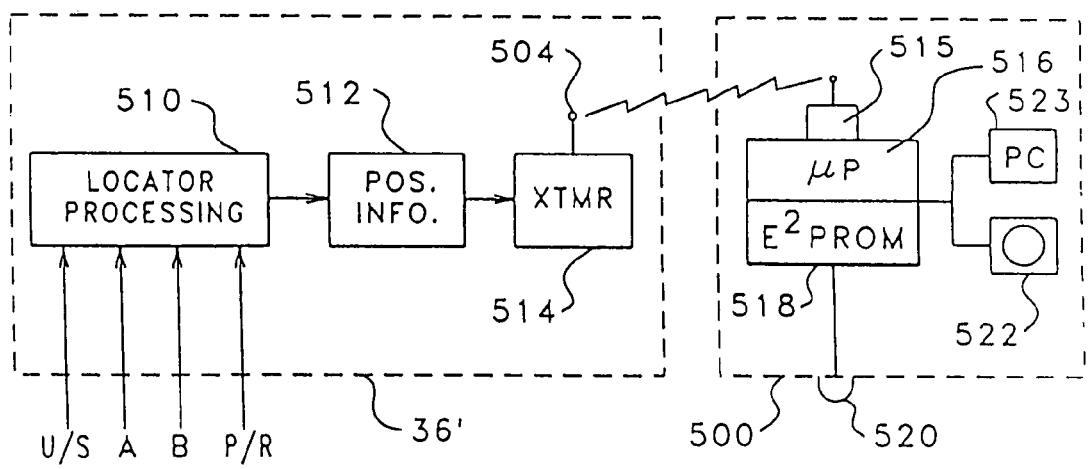
FIG. 6 diagrammatically illustrates an overall arrangement which is designed in accordance with a first embodiment of the present invention and which utilizes much of the technology of the Mercer Patents and the remote processing system generally shown in FIG. 4 and designed in accordance with the present invention to carry out a method of establishing and recording the actual path taken by the boring tool, as shown in FIG. 5.

Turning now to FIGS. 5-7, attention is directed to the way in which locator 36' is used by operator 26 in cooperation with remote processing system 500 and boring machine 24 which is used by operator 20 in order to establish and record the actual path taken by boring tool 28 as it moves from its starting point, for example starting pit 22, to its target point, for example termination pit 34. FIG. 5 diagrammatically depicts the starting point ST, the termination or target point T, the actual path taken by the boring tool, which path is indicated at AP and a reference path RP, all of which are located within a given region 506. For purposes of clarity, region 506 is set within a Cartesian coordinate system where the x-axis extends horizontally in the general direction of forward movement of the boring tool, where the y-axis represents the horizontal, general lateral direction with respect to the boring tool and where the z-axis represents vertical depth. For purposes of the present discussion, it will be assumed that the boring tool 28 is caused to move along path AP by operator 20 who momentarily stops the boring tool at various spaced apart measuring locations which are indicated at 508 in FIG. 5. These measuring locations may be provided at regular spaced intervals or irregularly spaced intervals and the distance between measuring locations may vary. In one embodiment, the distance between each measuring location is one drill rod making up drill pipe 10, which drill rod is approximately 10 feet. Suitable and readily providable means may be used to actually measure the amount of drill pipe in the ground and report the amount to system 500, as indicated by arrow 501 in FIG. 4. As will become apparent hereinafter, by spacing measuring locations close to one another, the actual path AP taken by the boring tool can be accurately established and recorded. Reference path RP extends along the surface of the ground and can be the ground level component of the intended path taken by the boring tool or it can be a laterally spaced ground level component, as illustrated in FIG. 5. In either case, it must be established either prior to the actual boring operation or as the boring operation proceeds, as will become apparent.

Figure 1:
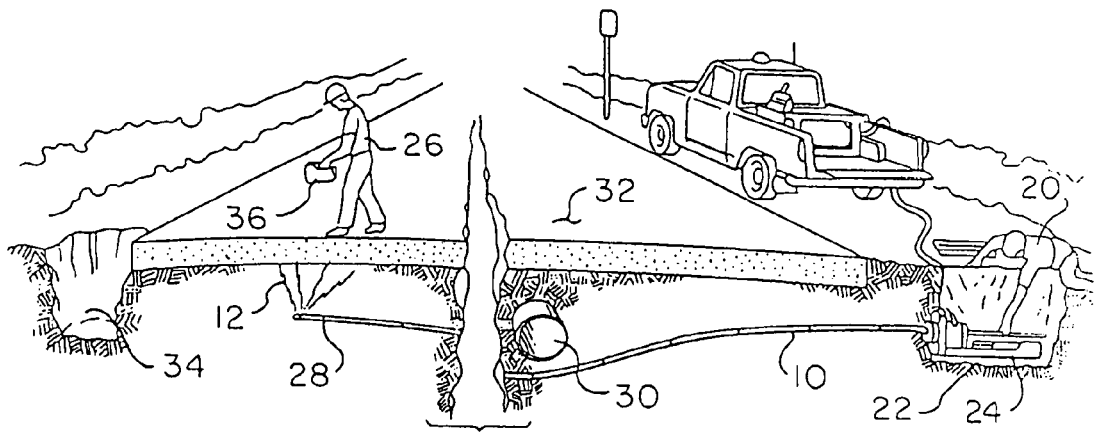
FIG. 1 is a partially broken away elevational and perspective view of a boring operation described in the previously recited Mercer Patents.

With the foregoing in mind, attention is now directed to the way in which the boring operation proceeds. At the start, operator 20 drives the drill pipe 10 out of machine 24 which, in turn, pushes drill head in front of it. At the same time, the boring tool is guided by operator 20 in the intended direction. In order for the boring tool to be guided in this way, operator 26 follows it with locator 36'. As this operator does so, the locator 36' and boring tool 28 cooperate with one another to generate certain information about the position of the boring tool relative to the position of the locator. Two specific components of this positional information are the intensities of electromagnetic field 12 at the locator as measured by antennae 122 and 124. The measuring information may also include the pitch and roll positions of the boring tool which are measured directly by sensors on the boring tool and transmitted by means of radio wave from the boring tool to the locator. In the case of the Mercer Patents, this information is processed by locator 36 and operator 26 using this processed information conveys it verbally to operator 20 who uses it for guiding the boring tool. In the case of the present invention, while locator 36' processes the information in the same manner as locator 36, the processed information is relayed from locator 36' to remote processing system 500 for further processing by the latter, as previously mentioned in conjunction with FIG. 4. The way in which locator 36 processes this information in order to determine the position of the boring tool at any given point in time is described in the Mercer Patents and reference is made thereto. This is the case whether the locator is directly over the boring tool as illustrated in FIG. 1 or laterally to one side of the boring tool as will be seen hereinafter in the case of the present invention.

As boring tool 28 is moved along its actual path AP, the positional information described immediately above is continuously generated and processed so that the boring tool may be appropriately guided. However, heretofore this information has not necessarily been recorded in any permanent form. In the case of the present invention, as will be seen, it is recorded intermittently, specifically at spaced apart measuring locations 508, and in accordance with a specific, consistent procedure while the boring tool is at a momentary standstill at each such measuring location, as will be described immediately below in conjunction with FIG. 7.

Figure 8A:
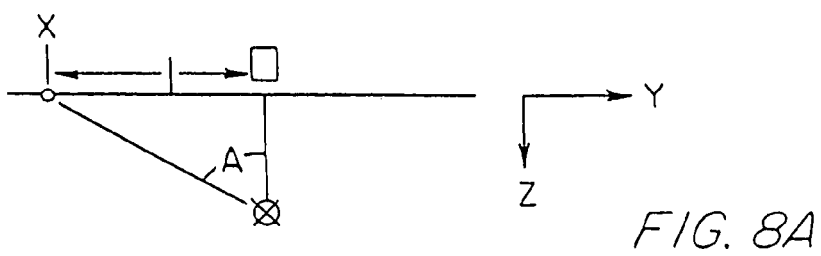
FIGS. 8A, 8B, & 8C diagrammatically illustrate the way in which the locator of FIG. 3 is used to determine the position of the boring tool of FIG. 1 when the boring tool is at any given measuring location on its path of movement shown in FIG. 5 while the locator is positioned at a corresponding reference point on the reference path which is shown in FIG. 5.
Figure 8B:
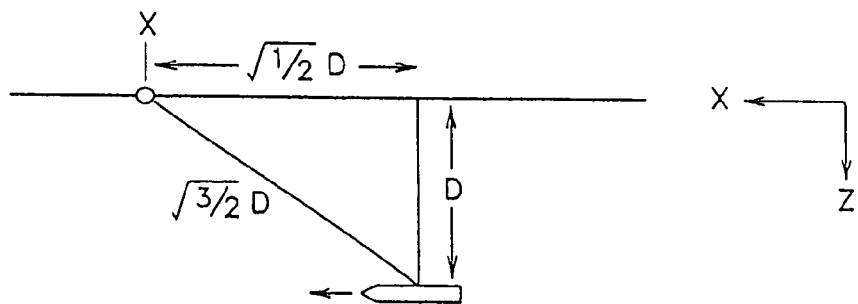

Turning to FIG. 7, the boring tool 28 is shown momentarily stopped at its first measuring location 508. With the boring tool in this stationary position, operator 26 uses locator 36' to locate one or both locate points FLP and RLP in the manner described in the Mercer Patents. In this regard, if as in the present case this is the first measurement and the operator is not sure of the direction of the boring tool, i.e. its yaw direction, he or she might wish to measure both the front locate point FLP and the rear locate point RLP in order to establish the axis of the boring tool, which axis extends through the two locate points. In subsequent measurements, if the operator knows the yaw direction of the stationary boring tool, it may be only necessary to measure one of the locate points, for example the front locate point, in order to establish the boring tool's directional axis. As stated previously, the locate points, either the front locate point or the rear locate point, is established when the vertical component of the electromagnetic field 12 bisects antennae 122, 124 when the antennae are above the locate point and, in the case of region 506, in the x, z plane as illustrated in FIG. 8b. Once the operator finds the appropriate locate point, either facing towards or away from the boring tool, the rest of the procedure would be the same one for each measurement. Should the operator select for example the front locate point, he or she then rotates the locator 90° either to the right or to the left but consistently, for example to the right if the operator is facing away form the boring tool at the front locate point in case of FIG. 5, and then, while maintaining the locator at the same elevation relative to the ground (assuming the ground is flat), the operator walks in a direction perpendicular to the directional axis of the boring tool to the reference path RP, thereby establishing a reference point 508R which is associated with the first stationary measuring location 508. With the locator in this position, the antennae 122, 124 are now generally in the y, z plane, as illustrated in FIG. 8A. In this latter regard, for purposes of discussion and a frame of reference within the x,y,z coordinate system, it is being assumed that the direction of movement of the boring tool is in the x axis. This is obviously not always the case, as illustrated, for example, FIG. 5. However, in order to understand and appreciate the present invention, that will be assumed at least with regard to the discussion of FIGS. 8A, 8B, and 8C. The data processing can easily compensate for variations in the actual direction of movement.

Once the locator is at its reference point 508R corresponding with the stationary measuring location 508 of the boring tool, operator 26 lets operator 20 know, at which time operator 20 manually actuates the remote processing system 500 so that the positional information transmitted thereto from the locator, as described in conjunction with FIG. 4 is recorded and further processed in a manner to be described hereinafter. This procedure is repeated from one location 508 to the next with the operator most preferably following the same procedure each time, that is, first finding the same locate point, facing in the same direction at the locate point and then turning 90° from the directional axis of the boring tool from that locate point, consistently either to the left or to the right, and finally either moving forward or backward to the reference path to establish a corresponding reference point 508R.

As indicated previously, with the boring tool stationary at a location 508 and with the locator 36' at a corresponding reference point 508R, the two cooperate with one another so as to generate certain information about the position of the boring tool relative to the position of the locator. In other words, means are provided partially at and forming part of the boring tool and partially at and forming part of the locator for generating this latter information. In the case of the Mercer Patents, the boring tool itself includes means for emitting the previously described dipole field 12 and it also includes a pitch sensor and a roll sensor. At the same time, locator 36 and locator 36' each includes previously described antennae 122 and 124 and associated processing components for generating the following information components:

the intensity of field 12 as measured by antenna 122 (referred to hereinafter as intensity A);

(2) the intensity of field 12 as measure by antenna 124 (hereinafter referred to as intensity B);

(3) the calibrated values for A and B;

(4) the signal ratio which is the value of one of the antennae measurements, for example measurement A, divided by the sum of A and B; and (5) pitch.

Calibrated A and B can be accomplished in a conventional manner by initially placing the boring tool 28 on the ground and placing the locator a known distance from it and thereafter measuring A, B intensity components and making sure that readings are adjusted to read the appropriate distances. In addition, the distance from the ground to the locator can be compensated for as described in the Mercer Patents. All of this information is readily available in the system described in the Mercer Patent.

Figure 8C:
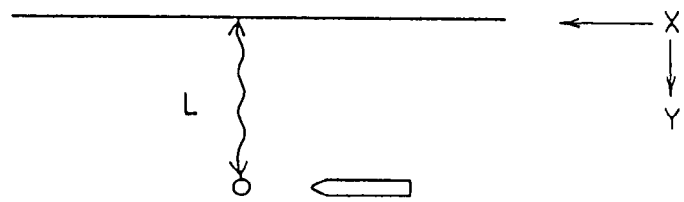

Referring specifically to FIGS. 8A, 8B and 8C, with this information, the depth D of the locator (FIG. 8B), the distance L between the negative locate point used and the associated reference point 508R (FIG. 8A and FIG. 8C) and the angle A (FIG. 8A) is determined by locator 36' (as it can with locator 36). Therefore, at each and every reference point 508R, the locator 36' can generate information providing the position of the boring tool at its corresponding measuring location 508 and this information can be stored at or in the locator or transmitted wirelessly from the locator to the remote processing system 500 which, in turn, can record the information. As will be seen below in conjunction with FIG. 6, system 500 can then display overall path AP (based on this positional information) along with the reference path RP and it can permanently record it. In this regard, it is to be understood that system 500, which will be described hereinafter, can be duplicated at the locator itself, in part or in toto, or replace the remote system, again in part or in toto. Obviously, a local system 500 would not require wireless receiving means. Some or all of the local system can be formed as an integral part of the locator or it can be designed to plug into the locator as an add-on. One example of a plug-in component might be a lap top computer which provides the same portability as the locator itself.

The discussion immediately above assumes a perfectly horizontally boring tool. Processing circuitry within locator 36' and/or system 500 can be readily provided with appropriate algorithms to compensate for pitch in the boring tool, particularly since pitch is being directly measured and provided to the locator. Thus, for example, if the boring tool is angled downward 10° from it position shown in FIG. 8B, it should be clear that the front and rear locate points would be different. Since the processing circuitry in the locator or system 500 knows this from the actual measurement of the boring tool's pitch, it can compensate accordingly.

Turning now to FIG. 6, attention is directed to the processing components contained by and forming part of locator 36' and required to interconnect locator 36' with remote processing system 500 in order to carry out the method described above. These processing components (which correspond to the processing circuitry of locator 36 as illustrated in FIGS. 5A and 5B in the Mercer patents) include locator processing means 510 including antennae 122 and 124 for detecting field 12 and antenna 126 for receiving the pitch and roll information (although a separate antenna need not be provided for this purpose). This information is processed so as to provide the locator operator 26 with the appropriate positional information which can be read out by means of readout component 512 at the locator itself. This positional information is transmitted by telemetry transmitter 514 by means of radio wave to a telemetry receiver 515 and thereafter to microprocessor 516 which stores the information selectively in, for example, an EEPROM 518. EEPROM 518 could also form part of a local system 500 as discussed above and, hence could be part of the locator itself or readily plugged into the locator. As indicated previously, only positional information that is provided during the measurement periods described previously are stored. Thus, in the case of processing system 500, either the remote system as shown or the local system discussed above, the system includes an actuatable button 520 or other suitable means that operator 20 can actuate in order to insure that the next incoming positional information will be recorded. Operator 26 lets operator 20 know when to actuate button 520. The microprocessor then can take all of the recorded information and generate a graph on display 522 and or it can input the information to a personal computer 523 which, in turn, can provide a permanent graphic record which can be printed out. In this regard, if the drill pipe 10 is measured as it is let out into the ground, that information can be fed to the microprocessor and used in conjunction with the other positional information to generate the graph.

The boring technique described above can be readily carried out by one with ordinary skill in the art by modifying locator 36 in a way which results in locator 36' and by following the procedures described herein. The modification of locator 36 resulting in 36' is readily providable in view of the Mercer patents and the disclosure herein. Once, the boring tool 28 is guided from its starting pit, for example pit 22, to its ending or target pit, for example pit 34, the appropriate utility cable or any cable for that matter can be connected to the forward end of the drill pipe, with or without the boring tool attached thereto, and the drill pipe can be pulled back through the bored tunnel to the starting pit, pulling the cable with it. At the same time, it is to be understood that the present boring technique can be used to establish and record the path of the boring tool for reasons other than installing cable. For example, it may be desirable to record the path of an exploratory drilling operation.

In addition to the foregoing, it is to be understood that the present invention is not limited to the particularly described procedure for establishing path AP. Other procedures could be set up based on the teachings herein. For example, the procedure described calls for the operator walking between the various locate points and the reference path RP. Based on the teachings herein, another procedure could be established, for example, where operator 26 continuously walks on the reference path RP and as he or she does so the locator itself could be appropriately manipulated based on balance points and signal strength ratios in antennae 122, 124 in order to establish the actual path AP.

In the overall arrangement illustrated in FIG. 6, the processing components contained by and forming part of locator 36' and the remote processing system 500 were described in conjunction with FIGS. 5, 7 and 8A-C to illustrate a method of establishing and recording the actual path taken by boring tool 28 with respect to a particular above ground reference path taken by operator 26. For purposes of the present discussion, FIGS. 1 and 8B illustrate the relationship between the boring tool, actually the path it takes, and the reference path established by operator 26. Note specifically that at any point on the reference path, the distance from that point to the vertically aligned point on the actual path is provided. Indeed, the overall arrangement illustrated in FIG. 6 is intended to provide the depth D illustrated in FIG. 8B along with the other positional dimensions shown in FIGS. 8A and 8C. However, this assumes that the reference path remains unchanged. Should the terrain containing the reference path change with time, it may be difficult, if not economically impossible, to reestablish the actual path taken by the boring tool. As will be seen below, the arrangement illustrated in FIG. 9 is designed to establish and record the actual path taken by the boring tool and allow the path to be easily found at a later date even if the terrain above the actual path changes with time.

Figure 9:
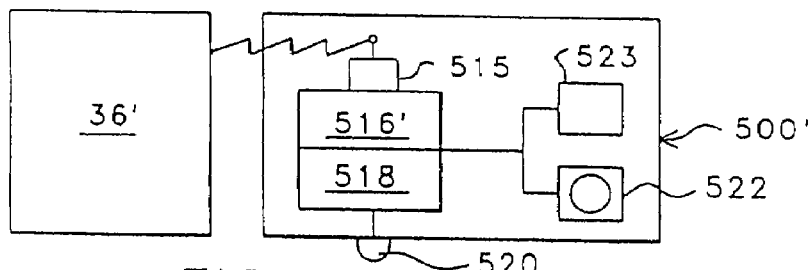
FIG. 9 diagrammatically illustrates an overall arrangement which is designed in accordance with a second embodiment of the present invention and which utilizes all of the technology of the arrangement illustrated in FIG. 6 and additional technology in order to carry out the method of not only establishing and recording the actual path taken by the boring tool relative to a reference path, but also establishing and recording the reference path itself which may subsequently change with time and a vertical survey reference level which will remain unchanged with time.

Turning specifically to FIG. 9, the overall arrangement shown there includes previously described locator 36' and a slightly modified remote processing system 500. It may be recalled that locator 36' includes an array of processing components including locator processing means 510 for providing the positional information described previously including specifically pitch information, which positional information is ultimately transmitted by telemetry transmitter 514 to remote processing system 500'. This latter system may be identical to system 500, with one exception. System 500' includes the microprocessor 516' which will be described hereinafter rather than the previously recited microprocessor 516. Otherwise, as just stated, the two processing systems 500 and 500' can be identical. Thus, as illustrated in FIG. 9, system 500' is shown including a telemetry receiver 515, an EEPROM 518, an actuatable button 520, a display 522 and a personal computer 523, all of which were described previously in conjunction with FIG. 6.

Microprocessor 516' is designed to carry out all of the processing steps of microprocessor 516 described previously and more. Specifically, microprocessor 516' is not only able to establish the actual path taken by the boring tool with respect to the reference path taken by operator 26, but it is also capable of establishing both the actual path taken by the boring tool and the reference path with respect to a vertical survey reference path which will not change with time. The monitor 522 and the personal computer with an appropriate printer serve to display in real time and permanently record, respectively, the actual path taken by the boring tool, the reference path taken by operator 26, and the vertical survey reference level. All three are graphically depicted in FIG. 11. This latter figure actually represents graphically data taken during operation of a prototype of the overall arrangement illustrated in FIG. 9, as will be discussed in more detail hereinafter.

Figure 11:
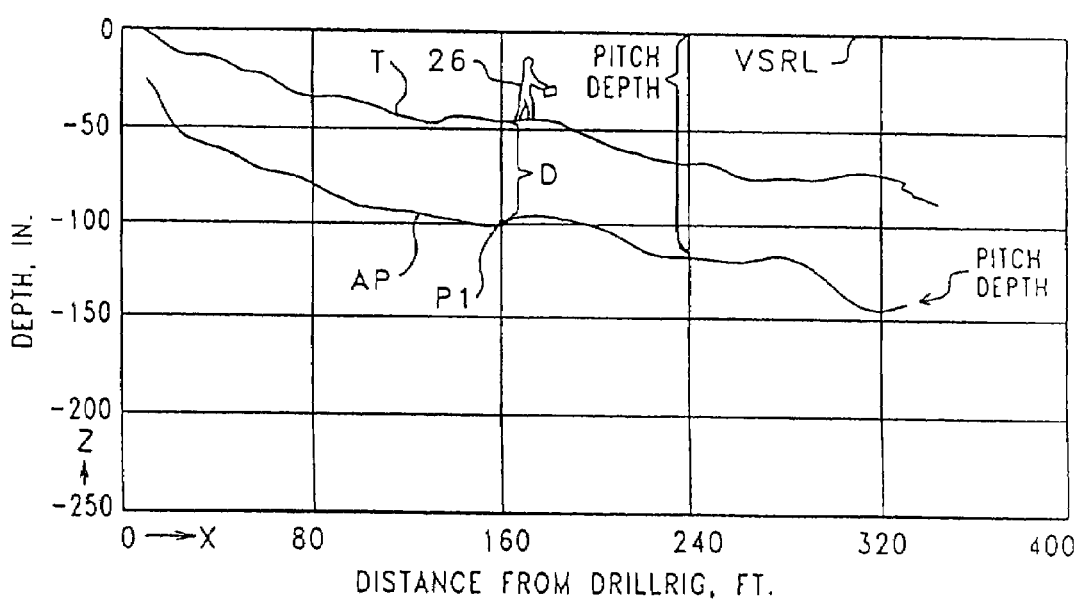
FIG. 11 graphically depicts the path taken by the boring tool, the reference path and the vertical survey reference level, all of which are established and graphically recorded by the arrangement of FIG. 9.

For the moment, it suffices to point out certain aspects of the graphical illustration. In particular, it should be noted that the graph resides in the X-Z plane, as defined previously, where the X component of the horizontal distance traveled by the boring tool is represented by the X axis and depth is represented by the Z axis. The vertical survey reference level (VSRL) Is a true horizontal survey level, for example 2300 feet above sea level, which is to be established by operators 20 and 26 at the beginning of the boring operations. Logic dictates that the VSRL coincide with the starting point of the reference path taken by operator 26, although this is not a requirement. Indeed, subsequent VSRLs can be taken to check the accuracy of the locating process. The initial VSRL was, however, selected in the case of FIG. 11 and is shown at VSRL in that figure. The actual path taken by operator 26 is depicted in FIG. 11 at T which actually topographically represents ground level at the time the overall boring process was undertaken. The actual path taken by the boring tool is depicted in FIG. 11 at AP and also represents what will be referred to as Pitch Depth with respect to the vertical survey reference level at any horizontal point along the actual path.

Still referring to FIG. 11, at any given horizontal point on the actual path AP, for example the point P1, the actual vertical distance between that point and the reference path T is the distance D which can be established by either the overall arrangement of FIG. 6 or the overall arrangement of FIG. 9 as described previously. The distance between any given horizontal point on the actual path, for example point P1, and the vertical survey reference level VSRL is the distance which is referred to as Pitch Depth. The overall arrangement illustrated in FIG. 6 is not able to establish Pitch Depth, however the arrangement of FIG. 9 is able to do so in the manner to be described hereinafter. By establishing and recording the actual path AP taken by the boring tool with respect to the vertical survey reference level VSRL, the actual path AP can always be found at a later date, even if the reference path T is lost as a result of a change in terrain. At the same time, the overall arrangement illustrated in FIG. 9 has the additional advantage of being able to graphically depict the reference path with respect to VSRL so that its original topography can be determined days, months and years later should the terrain change.

In order to understand how the overall arrangement illustrated in FIG. 9 and its microprocessor 516' in particular establishes the actual path AP taken by the boring tool, the reference path T and VSRL, reference is made to FIG. 10 and the data set forth in Table 1, which is provided immediately below.

TABLE 1

| Rod # | Pitch | Depth | Pitch Depth |
|-------|-------|-------|-------------|
| 1 | −32 | 23 | 23 |
| 2 | −12 | 40 | 49 |
| 3 | −1 | 45 | 57 |
| 4 | −2 | 48 | 58 |
| 5 | −9 | 46 | 65 |
| 6 | −3 | 51 | 72 |
| 7 | 0 | 44 | 74 |
| 8 | −6 | 44 | 78 |
| 9 | −5 | 52 | 84 |
| 10 | −5 | 54 | 90 |
| 11 | 3 | 53 | 91 |
| 12 | −3 | 48 | 91 |
| 13 | −3 | 47 | 95 |
| 14 | −4 | 57 | 99 |
| 15 | 2 | 57 | 100 |
| 16 | 4 | 50 | 97 |
| 17 | 0 | 51 | 94 |
| 18 | −1 | 52 | 95 |
| 19 | −2 | 49 | 97 |
| 20 | −3 | 45 | 100 |
| 21 | −7 | 46 | 106 |
| 22 | −7 | 53 | 114 |
| 23 | 0 | 53 | 118 |
| 24 | 2 | 49 | 117 |
| 25 | −3 | 52 | 118 |
| 26 | −2 | 45 | 121 |
| 27 | 9 | 41 | 117 |
| 28 | −5 | 40 | 114 |
| 29 | −8 | 47 | 122 |
| 30 | −13 | 60 | 134 |
| 31 | −5 | 75 | 145 |
| 32 | 4 | 72 | 146 |
| 33 | 4 | 64 | 141 |

The data in Table 1 include certain information generated by the overall arrangement of FIG. 9 as the boring tool moves through the ground. In particular, this information is taken at 10 foot intervals which in Table 1 are referred to as rod numbers 1, 2, 3 and so on up to rod number 33. The information in Table 1 includes the pitch of the boring tool at each rod number, its depth D and its Pitch Depth. The boring tool's pitch is preferably measured directly from a sensor on the boring tool, although this is not absolutely necessary. The depth D is preferably measured in the manner described previously in conjunction with FIGS. 1-8. Pitch Depth is calculated in the manner to be described immediately below by means of system 500' using the pitch information from rod number to rod number and the fact that the boring tool moves a fixed or at least a known distance from rod number to rod number, for example 10 feet.

Figure 10:
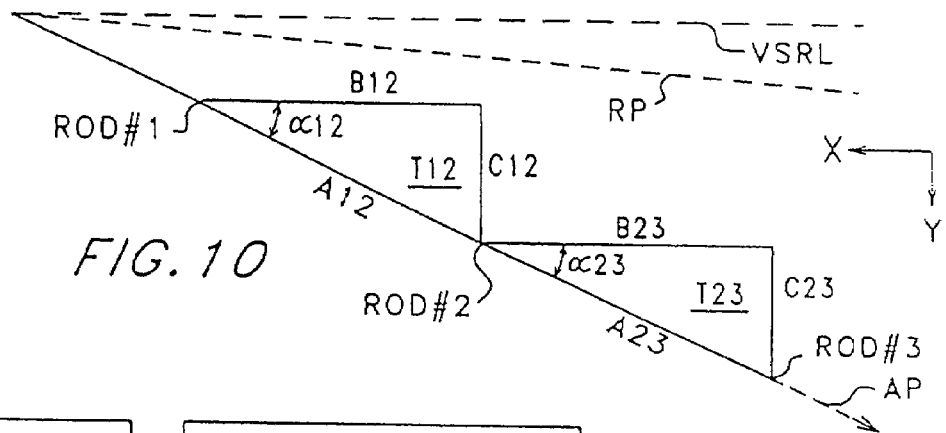
FIG. 10 diagrammatically depicts a way in which the arrangement of FIG. 9 establishes the path taken by the boring tool, the reference path, and the vertical survey reference level recited immediately above.

Turning now to FIG. 10, attention is directed to the way in which system 500' determines Pitch Depth at any particular rod number, for example first at rod number 2 and then rod number 3, based on the data in Table 1. To this end, for purposes of illustration, two right triangles are provided in FIG. 10, as indicated at T12 and T23. The right triangle T12 includes a hypotenuse A12 representing the path taken by the boring tool over a 10 foot span from rod number 1 to rod number 2, the horizontal side B12 extending in the X direction parallel to VSRL and a vertical side C12 extending in the Z direction and defining the right triangle with side B12. An angle ∝12 is defined by the hypotenuse A12 and horizontal side B12. In a similar manner, the right triangle T23 includes a hypotenuse A23, a horizontal side B23, a vertical side C23 and ∝23. The objective of system 500' is to determine the length of vertical sides C12, C23 and so on for each right triangle corresponding to each increment of movement of the boring tool. The length of each of these sides represents an increment of depth relative to the vertical survey reference level VSRL. In the case of right triangle T12, for example, the microprocessor knows the length of hypotenuse A12 since this is the actual distance traveled by the boring tool from rod number 1 to rod number 2. In the case of our example, this length is ten feet and can be input to the microprocessor as a given or if the overall arrangement is operating on random intervals of movement of the boring tool rather than on rod numbers, the distance traveled by the boring tool could be input by a suitable means of sensing the distance traveled by the boring tool using suitable means for sensing movement of the drill string at the starting pit. Assuming for purposes of illustration that the distance A12 is 10 feet, then the only other information the microprocessor needs in order to determine the length of side C12 and therefore the incremental depth of the boring tool when it reaches rod number 2 is the angle ∝12. In accordance with the present invention, the angle ∝12 corresponds to the average pitch of the boring tool as it is measured at rod number 1 and rod number 2. In Table 1, the pitch of the boring tool, as directly measured, is −32 percent grade, where the minus sign indicates that the pitch angle is downward and to the right, as viewed in FIG. 10. The pitch of the boring tool, as measured at rod number 2 is −12 percent grade. Microprocessor 516' uses this information to establish an average pitch which is −22 percent grade based on the figures provided. At some convenient point in this calculation process, the microprocessor converts the average pitch angle of ∝12 from percent grade to degrees. Thus, −22 percent grade converts approximately to −12 degrees. Thus, with ∝ being −12 degrees and the hypotenuse being 10 feet or 120 inches, vertical side C12 can be readily calculated by the microprocessor according to the equation Sin ∝=C12/A12.

The only unknown in this equation is C12. In the case of our example, the length of C12 is approximately 26 inches. Therefore, Δ Pitch Depth is approximately 26 inches and the total Pitch Depth from VSRL to the rod number 2 point is 49 inches.

Turning now to triangle T23, the microprocessing steps just described are carried out to determine the length of side C23, that is, Δ Pitch Depth from rod number 2 to rod number 3. In this case, the actual pitch of the boring tool at point 2 is measured at −12 percent grade, the actual pitch of the boring tool at point 3 is measured at −1 percent grade, thereby resulting in an average pitch of −6.5 percent grade. This, in turn, converts to approximately −3.7 degrees. The hypotenuse A23 is known to be 10 feet or 120 inches. Therefore, the incremental length C23 or Δ Pitch Depth is approximately 8 inches and, therefore, the overall Pitch Depth at rod number 3 is 57 inches.

In Table 1, the Pitch Depth distance from VSRL at each and every rod number from rod number 1 through rod number 33 is shown and was measured in the matter just described. These data are graphically reproduced in FIG. 11 where it can be seen that each point on actual path AP taken by the boring tool is located at a Pitch Depth distance below VSRL with actual measurements being taken every 10 feet and interpolations being made therebetween. For example, the graph clearly shows that at 16 rod lengths out (160 feet) the boring tool is 97 inches (Pitch Depth) below VSRL. This is true whether or not the reference path taken by the operator at the time the information is gathered or is available.

It should be noted that establishing and graphically recording actual path AP with respect to VSRL does not require the depth D information that both arrangements of FIG. 6 and FIG. 9 can provide. However, it should also be noted that the depth D information is part of the data of Table 1. It is provided so that the reference path which is labeled T in FIG. 11 and RP in FIGS. 5 and 10 can be graphically depicted relative to VSRL and the actual path AP. In this way, if the terrain does not change as time goes on, the actual path T can be used to find the path taken by the boring tool. On the other hand, if the terrain does change, the vertical survey reference level can be used to find the actual path taken by the boring tool. Also, if for any reason the terrain changes and it is desired later to know what the terrain looked like when the boring process took place, such information is available from the curves of FIG. 11. With particular regard to VSRL, as stated previously, subsequent VSRLs can be taken and compared with calculated Pitch Depth data to test the accuracy or provide corrections to the calculations based upon the boring tool Pitch Data.

Two embodiments of the present invention have been describes thus far. The first embodiment related to an overall process for establishing the path taken by a boring tool with reference to the path taken by operator 26 as the operator carried locator 36'. This embodiment was described herein in conjunction with FIGS. 1-8 which included a description of the locator 36' and system 500 illustrated in FIG. 6. The second embodiment added to the first embodiment the ability to establish the path taken by the boring tool not only in conjunction with the reference path taken by operator 26 but also with respect to the vertical survey reference level. This second embodiment was described herein in conjunction with FIGS. 1-8 in combination with FIGS. 9-11 including, in particular, FIG. 9 which illustrated a modified system 500' along with the previously described locator 36'. As will be described in more detail hereinafter, the preferred way in which each of these latter embodiments is practiced is illustrated in FIGS. 12-15.

Figure 12:
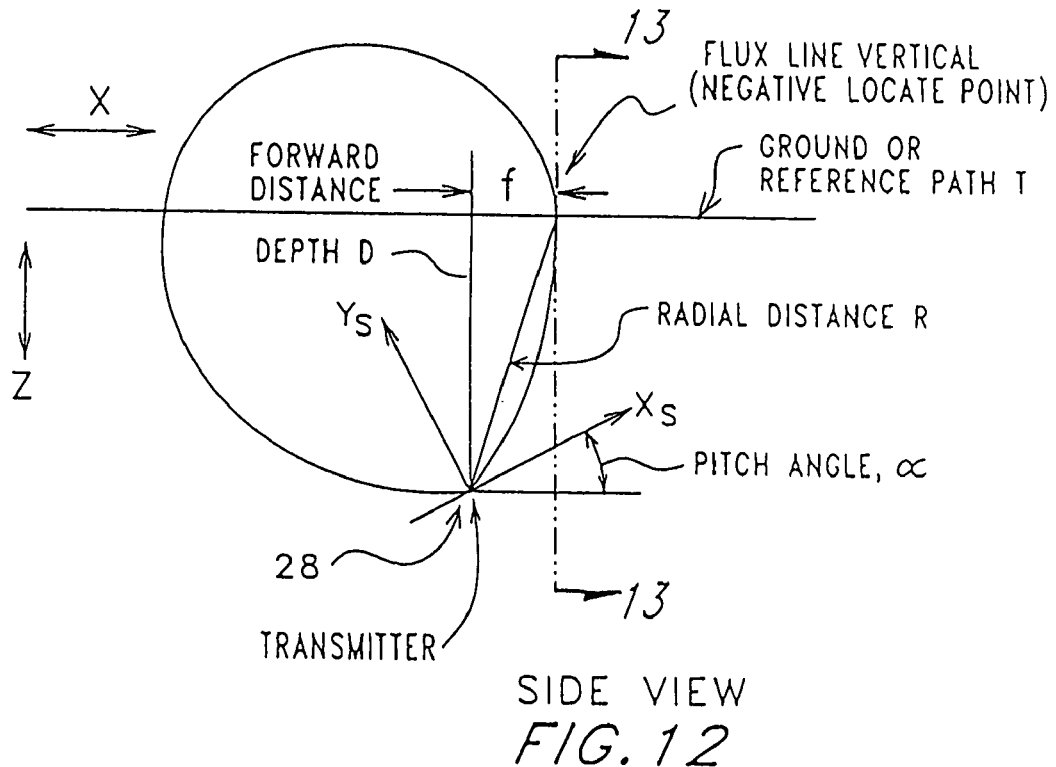
FIGS. 12 and 13 diagrammatically illustrate more detailed positional relationships between the boring tool and ground level.
Figure 13:
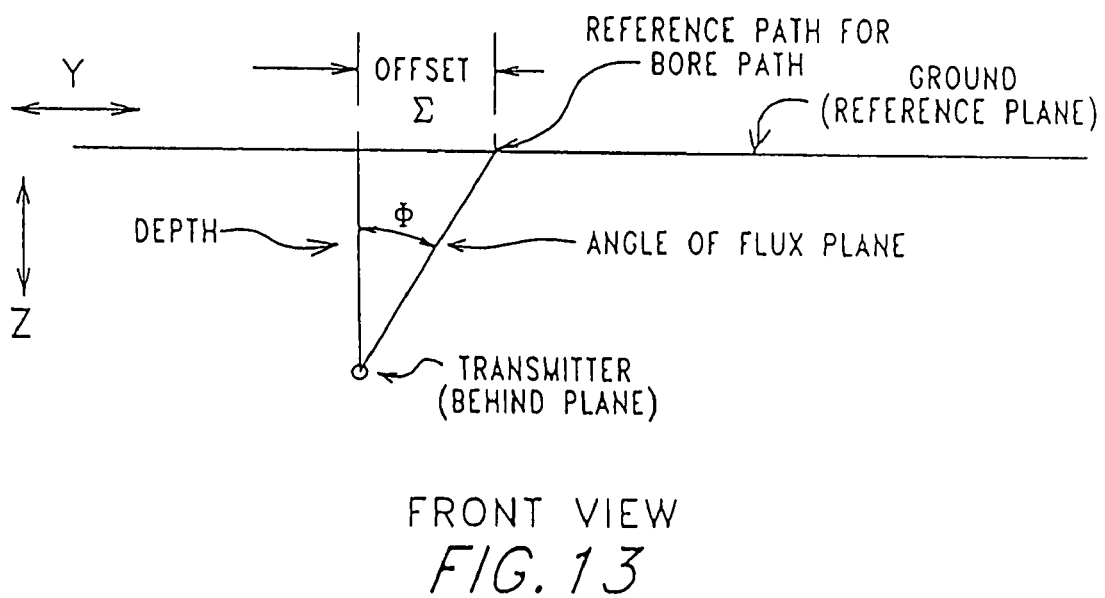

Turning specifically to FIGS. 12 and 13, a more definitive illustration of the positional relationship between boring tool 28 and ground level (the reference path T taken by operator 26) is shown. In particular, FIG. 12 specifically illustrates the pitch angle ∝ of the boring tool (actually its transmitter), the depth of the boring tool and one of the previously recited negative locate points, as well as Radial Distance from the boring tool to that negative locate point and the Forward Distance f. FIG. 13 specifically illustrates the angle Φ corresponding to the angle of the flux plane from the boring tool to the Reference Path and the offset distance Σ. These variously positional and orientational values are used in a manner to be described.

Figure 14:
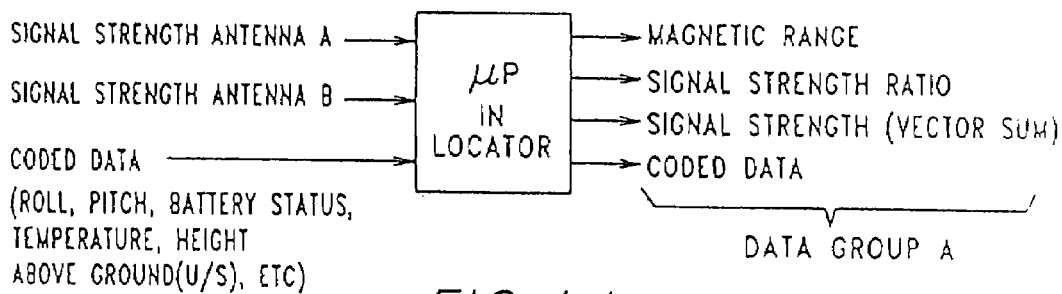
FIGS. 14, 15 and 16 diagrammatically illustrate, in block diagram form, a preferred overall arrangement for carrying out the same function as the arrangement of FIGS. 6 and 9.

FIG. 14 diagrammatically illustrates in block diagram form the microprocessing that takes place in locator 36' in accordance with a preferred version of both of the previously described first and second embodiments of the present invention. Note specifically that FIG. 14 actually illustrates the microprocessor and the locator including its inputs and its outputs. The inputs shown in FIG. 14 include the signal strength of the previously recited antenna A, the signal strength of previously recited antenna B, and coded data (digital data) corresponding to the role and pitch of boring device 28, its battery status, its temperature as well as other possible information that can be provided in digital, coded data form. The microprocessor in response to these inputs delivers at its output what is referred to as a data group A comprised of magnetic range (the distance between the locator and the boring tool or some other parameter related to the total magnetic field strength and the calibration factor), signal strength ratio (the signal strength of A divided the sum of the signal strengths of A+B), the vector sum signal strength (the square root of $A^2+B^2$), and the digitized coded data which is passed through from the input of the microprocessor.

Figure 15:
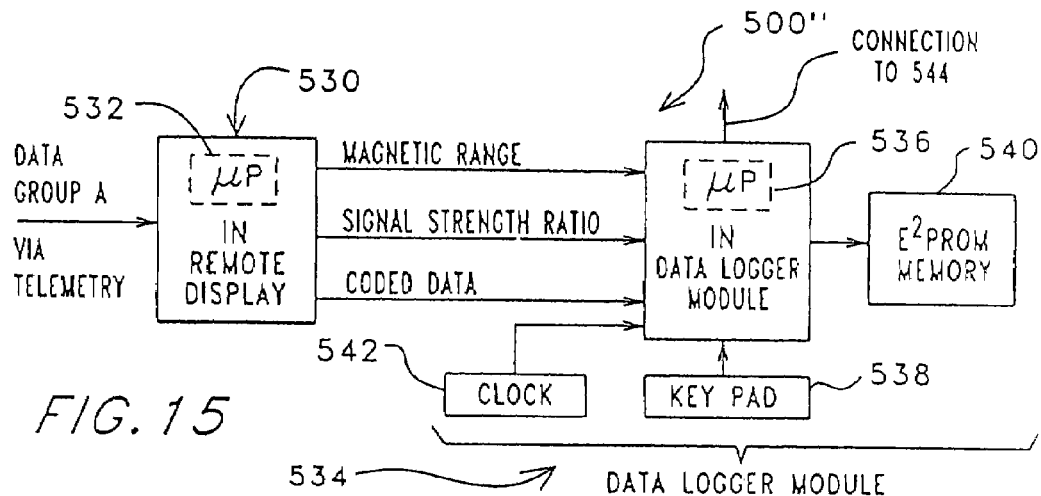

Turning to FIG. 15, this figure illustrates a modified version 500" of system 500' but provides the same function, as described previously in conjunction with system 500'. System 500" includes a remote display 530, that is remote with respect to the locator 36' and a microprocessor 532 within the remote display. System 500" also includes a data logger module 534. This module includes its own microprocessor 536, a keypad 538, memory ($E^2$PROM) 540, a clock 542 and provision for connection to a personal computer 544 (see FIG. 16) such as a laptop computer. The remote display 530 and the data logger module 534 are typically positioned at the starting pit with operator 20.

Still referring to FIG. 15, as shown there, the data group A is transmitted by means of telemetry from the output of the microprocessor of locator 36' to the input of microprocessor 532. In this way, the remote display is able to display everything the locator displays but has the ability to do it in at least partially a different format. Specifically, the locator does not display the signal strength ratio but the remote display displays the ratio as a left/right steering indication. The locator displays signal strength but the remote display does not. In addition, the microprocessor 532 outputs the previously described magnetic range, signal strength ratio and coded data to the input of microprocessor 536 in the data logger module. Using keypad 538, operator 20 at the starting pit is able to store this information into memory 540 at desired points in time, for example at ten feet increments of forward movement of the boring device. In this regard, using the keypad, operator 20 can vary the time in which data is stored and, in fact, can modify the storage of data. For example, should it be necessary to pull the boring tool rearwardly in order to, for example, pass around an obstruction, it may be necessary for the operator to store new data corresponding to the positions the boring tool are caused to pass through again as a result of the backtracking. Clock 542 can be used to time and date stamp the data as it is stored to recover the latest data as a result of the backtracking. The present invention further contemplates providing data logging within remote locator 36'. That is the logged data is stored within the remote locator itself, rather than being transmitted by telemetry to another location. In this instance, a "log" button (not shown) is provided on locator 36' such that data is logged in response to the operator of the remote locator depressing the log button. The logged data could be stored, for example, in EEPROM. It should be appreciated that by placing such data logging functionality into the remote locator, communication between the remote locator operator and the drill rig operator would not be required for data logging purposes.

Figure 16:
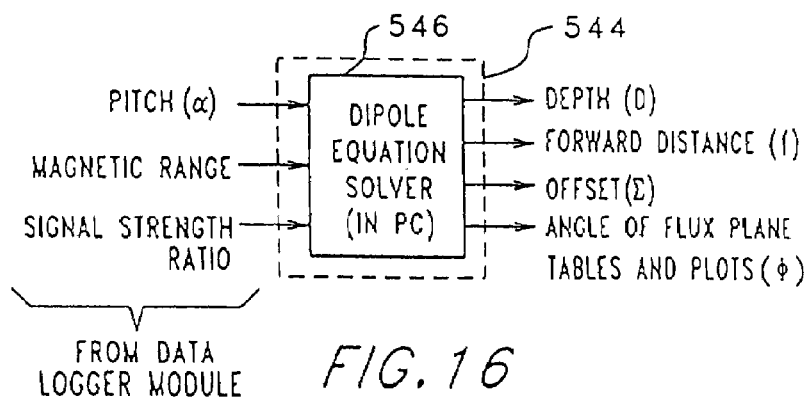

Referring now to FIG. 16, attention is directed to a dipole equation solver 546 which is software in personal computer 544. As seen in this latter figure, the dipole equation solver is adapted to receive the pitch ∝ of the boring tool, magnetic range and signal strength ratio either at the time of drilling or recalled later from the data logger. The dipole equation solver is configured to compute Depth D, Forward Distance f, offset Σ and angle Φ. In addition, the dipole equation solver of the present invention is configured for computing the depth of the boring tool beneath the surface of the ground when locator 500" is positioned at a forward locate point (see FIG. 2) or reference point 508R (see FIG. 5), as will be described in further detail immediately hereinafter.

Continuing to refer to FIG. 16, the present invention recognizes that the depth of the boring tool beneath the surface of the ground or any other reference surface is related to the signal strength of locating signal 12 at a forward locate point or reference point, to the pitch ∝ of the boring tool at that forward locate or reference point and to the signal strength ratio of antennas 122 and 124 (see FIG. 3). Having disclosed the existence of this relationship, one of ordinary skill in the art may approximate the relationship, for example, by a cubic curve in a way which permits dipole equation solver 546 to rapidly determine the depth of the boring tool with a relatively high degree of accuracy using minimal computing capacity. It is noted that one of ordinary skill in the art may appropriately adjust the equation or use the exact equations in view of the need for higher accuracy or due to the availability of higher processing power. Moreover, other parameters including forward distance (f), offset (Σ) and the angle of the flux plane may be solved for with the locator at the forward locate point or reference point. Any of these parameters may be displayed, if so desired. As just one example, offset (Σ) may be used to generate a steering display (not shown) which graphically shows the operator how far left or right of the desired path the boring tool is located or, conversely, how far left or right the boring tool (i.e., locating signal transmitter) is relative to locator 36'. It is to be understood that the present invention contemplates the use of any negative locate point within the context of these teachings. Therefore, rear locate points may be used, however the description above has been limited to a forward locate point and associated reference point or points for purposes of simplicity.

Figure 17:
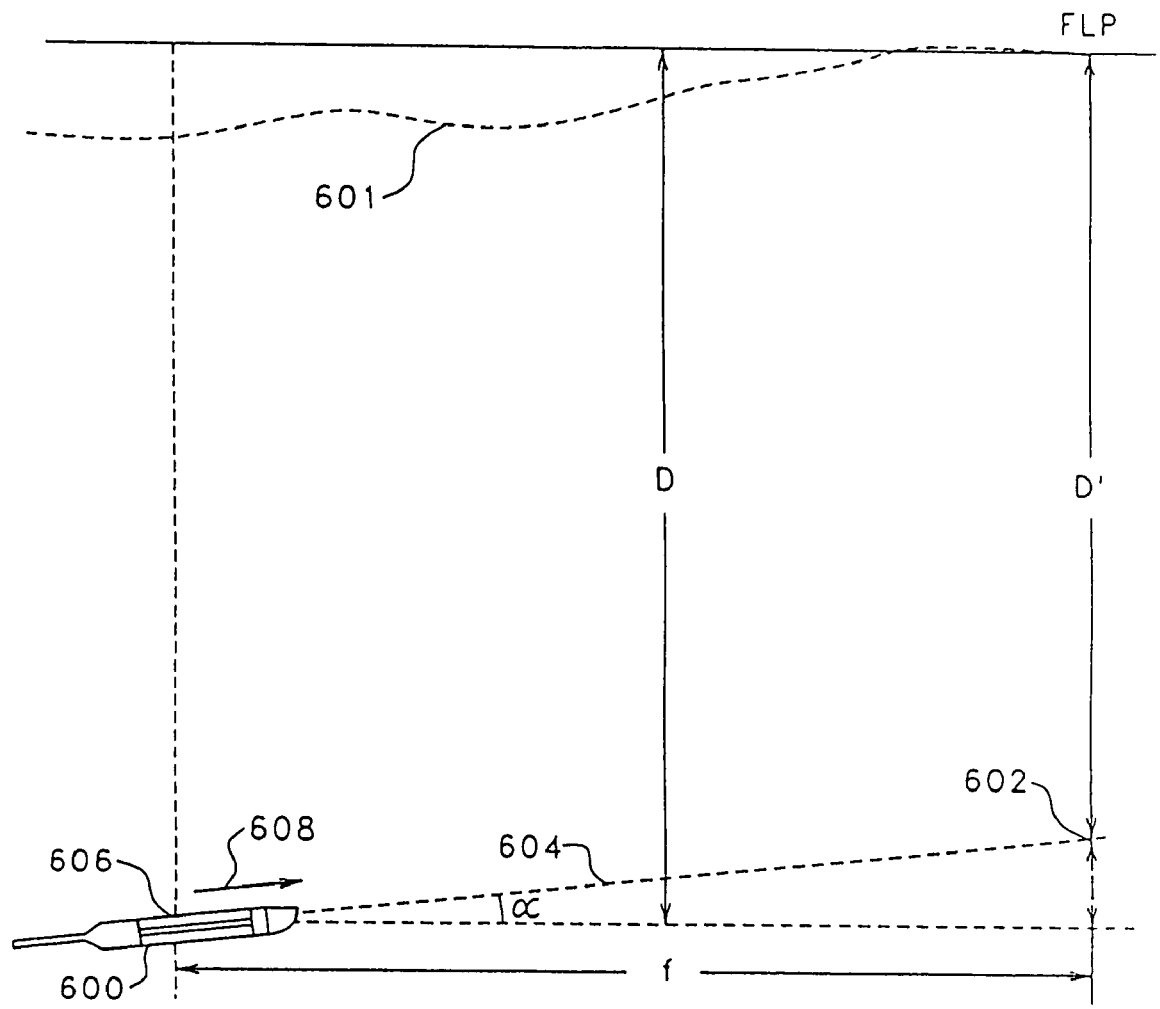
FIG. 17 is a diagrammatic elevational view illustrating the depth prediction method of the present invention.

Turning to FIG. 17, in accordance with the present invention, the forward distance, f, may be used in conjunction with pitch, φ, in a highly advantageous manner for predicting the depth of a boring tool 600 during drilling beneath the surface of the ground 601. More specifically, the depth D' of the boring tool may be predicted at an inground forward point 602 which corresponds to and lies vertically below the front locate point (FLP) at the surface of the ground. It is to be understood that the front locate point comprises a point, among a possible number of points including the rear locate point, which is defined by the locating field transmitted from the boring tool and that establishing the location of the front locate point is in no way coupled with a specific embodiment of a locating tool or instrument. Hence, the front locate point may be referred to in the remainder of this disclosure and in the appended claims as a field defined forward point.

Continuing to refer to FIG. 17, boring tool 600 is illustrated traveling along a predicted path 604 from an inground upstream point 606 in a direction indicated by an arrow 608 toward the inground forward point. Path 604 is assumed to be straight and proceeds at the pitch, $\phi$, which is the pitch of the boring tool at inground upstream point 606. As described above, $\phi$ may be obtained as data measured by a pitch sensor housed within the boring tool, while forward distance, f, may be calculated based on $\phi$ and the strength of the locating signal. Thereafter, an increment I may determined as (f*tan $\phi$). Depth D, corresponding to the inground upstream point, may also be calculated using the calibrated magnetic locating signal intensity, the height of a locating receiver above the ground and $\phi$. Depending on whether $\phi$ is positive or negative, increment I is appropriately added to or subtracted from D in order to calculate predicted depth D'. In the present example, I is subtracted from D in arriving at the proper value for D'. The latter may then be displayed on the locator unit and/or transmitted by telemetry to a location such as, for example, the drill rig. It is noted that, in this particular example, the boring tool is at a depth which is less than D at inground upstream point 606 due to the topography of the surface of the ground. Nevertheless, the determination of D' beneath the surface of the ground at the field defined forward point is correctly predicted.

Still referring to FIG. 17, it should be appreciated that the predicted depth feature of the present invention is highly advantageous since the operator of the system may make appropriate steering adjustments in the event that the predicted depth is inappropriate. For example, the operator may be standing above an obstacle at a known depth. In this manner, the operator can ensure that the boring tool passes either above or below the obstacle with a greatly reduced risk of hitting it. In addition, the time consuming process of drilling to the obstacle, realizing that the tool is about to hit the obstacle, retracting the boring tool and then re-drilling is avoided. It should be noted that distance f depends on depth D along with $\phi$, and that f may be far enough, within the steering capabilities of a typical boring tool, that an appropriate course correction may readily be performed. Alternatively, at less depth when f decreases, constraints imposed by the steering capabilities of the boring tool may necessitate pulling the boring tool back an appropriate distance such that course correction may be accomplished prior to the boring tool arriving at forward point 602. As an additional note, the present invention contemplates any suitable method for determining predicted depth D'. For example, D' may readily be approximated by a cubic curve in lieu of the full dipole equations or approximated by a calibration curve. One of ordinary skill in the art may derive the equations relating D' to the calibrated signal strength and the pitch using known dipole equations. It is submitted that the depth prediction feature of the present invention has not been seen heretofore and remarkably enhances the capabilities of any drilling system into which it is incorporated.

The above procedure was described based on the orthogonal arrangement shown in FIG. 5. However, other antenna arrangements could be employed so long as they provide a known relationship to the locating field. For example, a single vertical antenna in combination with the pitch of the boring tool may be used to obtain a predicted depth at a field defined forward point since the magnetic field is vertical at this point.

In the above discussion, dipole equation solver 546 was assumed to be implemented within locator 36', but remote processing could also be employed and the results displayed remotely and/or telemetered back to the locator for display.

All of the previously described arrangements assumed that the locator made its measurements at ground level which is of course possible. However in one preferred embodiment, operator 26 holds the locator at a comfortable position above ground, as shown in FIG. 1. In this case, the locator includes an ultrasonic measuring mechanism indicated by the input U/S in FIG. 6, as described in prior Mercer patents (cited herein) to compensate for the differences between the locator and ground level. In a second embodiment, the operator maintains the locator at a fixed line such as one produced by a laser. In this case, the locator itself includes a target spot which the operator can line up with a given laser beam defining the particular line. At the same time, the previously mentioned measuring mechanism can be used to measure to ground level. It should be appreciated that in any embodiment which compensates for the locator being held significantly above the surface of the ground, the locator may readily compensate for predicted depth at the field defined forward point in view of the height of the locator above the ground. For example, in one technique, the field defined forward point is identified using a locator which is held at a distance above the surface of the ground. The distance between the field defined forward point and the surface of the ground may be measured using, for example, the disclosed ultrasonic measuring mechanism. Thereafter, the measured distance of the locator (i.e., the field defined forward point) above the ground may be used in predicting the depth of the boring tool beneath the surface of the ground.

It should be appreciated that the concepts of the present invention, as used in the method taught herein, may be applied in a number of different ways by one of skill in the art. Therefore, the present examples and methods are considered as illustrative and not restrictive, and the invention is not to be limited to the details given herein, but may be modified within the scope of the appended claims.

What is claimed is:

1. An apparatus for use in a system including a steerable boring tool which transmits a dipole locating signal and for avoiding an inground obstacle at a known depth, and said boring tool is configured for transmitting a pitch orientation signal, said apparatus comprising:

a signal strength detector for measuring a signal strength of said locating signal at a location above the inground obstacle serving as a field defined forward point of the locating signal and with the boring tool located at a first position that is a forward distance from the obstacle such that the signal strength is representative of the depth of the boring tool at said forward distance from the obstacle;

a pitch sensing arrangement for determining a pitch orientation of the boring tool using the pitch orientation signal; and a processor for determining a predicted depth of the boring tool, based on at least generally straight movement of the boring tool by said forward distance toward the inground obstacle, said signal strength and said pitch orientation for use in steering the boring tool in a way that is intended to avoid the obstacle based on the predicted depth of the boring tool and the known depth of the obstacle.

2. The apparatus of claim 1 wherein said boring tool is characterized by a set of steering capabilities and said processor is configured for comparing said forward distance with said steering capabilities to determine a course correction for the boring tool to cause the boring tool to miss the obstacle.

3. The apparatus of claim 2 wherein said processor is configured for establishing that steering the boring tool forward from said first position, based on said steering capabilities and using said course correction, provides a greatly reduced risk of hitting the obstacle.

4. The apparatus of claim 2 wherein said processor is configured for establishing that steering the boring tool forward from said first position, based on said steering capabilities, is insufficient to provide a greatly reduced risk of hitting the obstacle.

5. The apparatus of claim 1 configured for using said field defined forward point substantially located on the surface of the ground.

6. The apparatus of claim 1 configured for establishing said field defined forward point at a height above the surface of the ground and for determining a distance between the field defined forward point and the surface of the ground and said processing arrangement, for predicting the depth of the boring tool below said field defined forward point, is configured for determining the predicted depth, based on the height between the field defined forward point and the surface of the ground, in conjunction with the measured signal strength and the pitch orientation.

7. The apparatus of claim 1 wherein said processor is configured for predicting said depth by (i) using said forward distance as a horizontal distance between the field defined forward point and said boring tool, (ii) determining the depth of the boring tool at said forward distance from the obstacle and (iii) using the depth of the boring tool at said first position and the pitch orientation, determining a predicted depth change increment below said field defined forward point.

8. The apparatus of claim 7 wherein said predicted depth is determined as the depth of the boring tool at said first position plus or minus said predicted depth change increment.

9. The apparatus of claim 7 wherein said processor is configured for determining said predicted depth change increment as being equal to the tangent of the pitch orientation, as determined at said first position multiplied by said forward distance.

10. The apparatus of claim 1 further comprising:
a display for displaying said predicted depth.

11. The apparatus of claim 1 wherein said processor is configured for using the pitch orientation and signal strength in a way which directly determines the predicted depth.

12. The apparatus of claim 11 wherein said processor determines the predicted depth using a cubic curve function.

13. The apparatus of claim 11 wherein said processor determines the predicted depth using a calibration curve.

* * * * *